May 25, 1943.    T. A. WELLS ET AL    2,320,022
MEANS TO ACCELERATE SETTING OF GLUE
Filed April 8, 1942
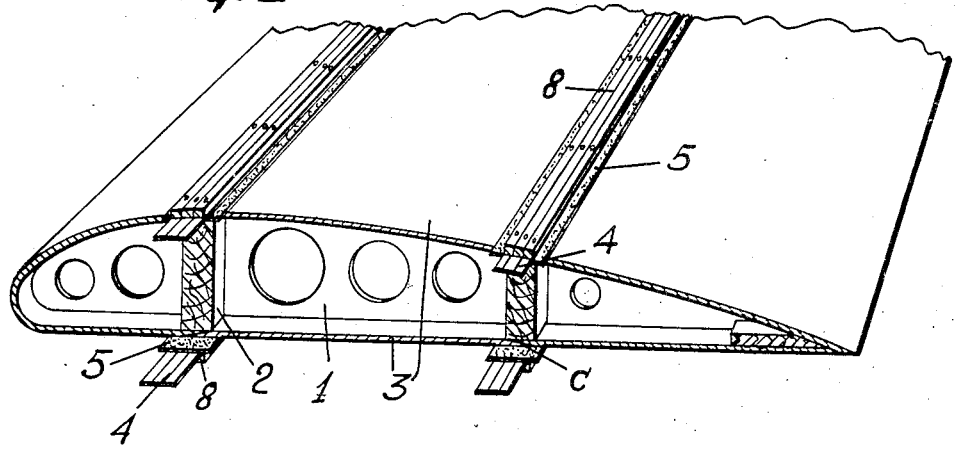
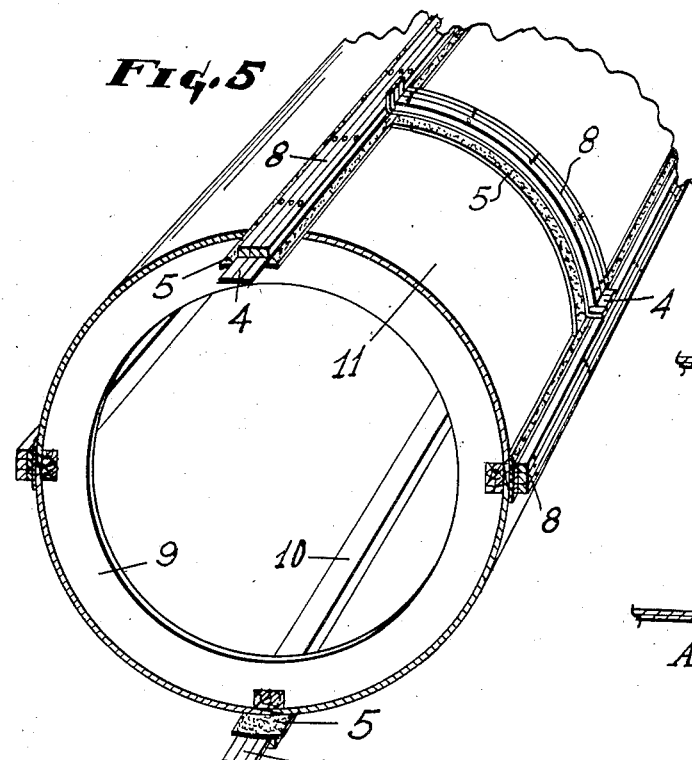
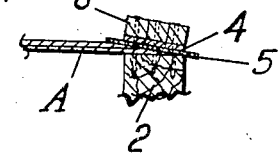
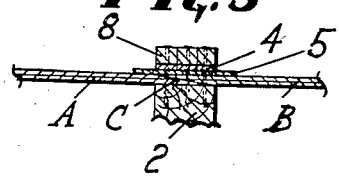
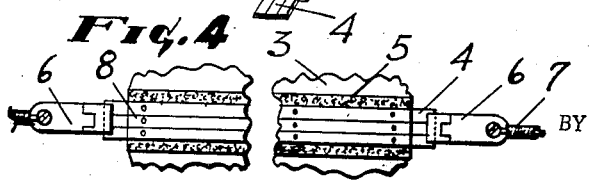
INVENTORS.
THEODORE A. WELLS
JOHN P. GATY
BY Patented May 25, 1943

2,320,022

UNITED STATES PATENT OFFICE 2,320,022

MEANS TO ACCELERATE SETTING OF GLUE

Theodore A. Wells and John P. Gaty, Wichita, Kans., assignors to Beech Aircraft Corporation, Wichita, Kans., a corporation of Delaware Application April 8, 1942, Serial No. 438,104

2 Claims. (Cl. 144—281)

This invention relates to a method to accelerate setting of glue, and has for its principal object the provision of a convenient and ready means of a practical nature to accelerate the assembly and completion of glued joints so that production may be expedited, and the cost at the same time decreased.

Another object of this invention is to speed up the construction of wooden structures such as aircraft by providing a method of binding glued joints firmly together by a simple and efficient means whereby the usual manually or power operated clamps are eliminated, as such clamps are impractical in the assembly of the component parts embodied, for example, in wing, fuselage, or other elements involved in aircraft construction, and inasmuch as the use of high strength glues required in the above mentioned wooden structures is of a very slow setting nature under normal room temperatures, we provide a means to cause the glue, or the adhesive substance being used, to set rapidly by introducing an appropriate high degree of heat through the medium of electrically heating elements placed between the glued joint and the binding means for the heating elements to said joint.

A still further object of this invention is to provide a heating element and binding means for the element to the surface of glued joints that will readily conform to a concave or convex surface in equal efficiency to that of a straight aligned surface.

These and other objects will hereinafter be more fully explained, reference being had to the accompanying drawing forming a part of this specification, and in which like characters will apply to like parts in the different views.

Referring to the drawing:

Fig. 1 is a cross sectional view of an aircraft wing illustrating one application of this invention.

Fig. 2 is an enlarged sectional view to illustrate the method of securing one plywood skin portion of a feathered joint.

Fig. 3 is a similar sectional view to that of Fig. 2 showing the assembly of a pair of feather jointed portions.

Fig. 4 is a fragmentary plan view illustrating the position of heating elements, their hook-up to a power line, and the binding means for the heating elements to a glued joint.

Fig. 5 is a perspective illustrated view showing the application of this invention as applied to a cylindrical form adaptable to the fuselage of an aircraft longitudinally and transversely thereof.

The invention herein disclosed relates to a method for speeding up the completion of glued joints, and more particularly such joints where a high strength glue is used which, under normal room temperature, is slow to set. The glue above referred to is required in the assembly of wooden structures such as aircraft which involves a plurality of elements jointly connected and secured by the application of the glue to the frame work; for example, for wing or fuselage portions as disclosed in the drawing.

Attention is directed to an airplane wing as shown in Fig. 1, said wing consisting of ribs 1, spars 2, and a plywood skin 3 enclosing the aforesaid elements, said skin being subdivided and feather jointed together to seat on the spars or other frame elements. To attach the skin to their respective upper and lower edges of a spar may be accomplished in steps as follows, the skin portion A having a beveled edge is seated on the edge of a spar with glue therebetween, and is secured thereto by the later described heating elements and securing cleats as shown in Fig. 2, and when the glue is sufficiently set the heating elements and cleats are removed for the application of skin portion B which is likewise glued to the bevel of portion A as illustrated in Fig. 3, whereby the joint is diagonally disposed as at C to form a feathered joint, the feathered edges of portions A and B as shown in Fig. 3 terminating on a plane with their respective sides of the skin portions. Said skin portions, being thus applied, are treated as follows with respect to heating and securing the same to a frame for setting of the glue, this being accomplished by the application of a plurality of metallic strips 4 of a pliable thin gauge to function as heating elements, which are separated from direct contact with the skin by a waxed saturated sheet of thin pliable substance 5, and the said heating elements being in number sufficient to cover the area to which the glue is applied, said heating elements at their oppositely disposed terminal ends having a clamp 6 connected thereto as a conductor of an electric current through the heating elements, and each clamp being connected to an electric power line 7 that extends to a source of electric current (the latter not being shown in the drawing).

Upon each heating element is positioned preferably a wood cleat 8 of equal width to that of the heating element, said cleat being of an appropriate thickness to bend in conformity to irregularities that may occur on a straight aligned joint, or to that of a convex surface, and likewise the heating elements are adapted to bend for peripheral engagement, each condition being shown in Fig. 5, which view is to represent a fuselage of an aircraft consisting of formers 9 and stringers 10 as the frame work, and plywood skin 11 as the enclosure for the frame work. The cleats and elements are juxtapositioned with respect to cross section, the said cleats being nailed at spaced intervals longitudinally as binding means to acquire tight engagement of the parts being glued together, the nails in this instance penetrating through the cleats, heating elements, and skin portions, and extending into the frame structure to which the skin portions are glued.

It will be understood that skin portions A and B may be assembled simultaneously and to their respective support similar to that shown in Fig. 3 to speed up the operation of securing all of said skin members together.

To avoid excess heating of the plywood skin by the electrically heated elements there is placed over the jointed portions of the plywood skin and beneath the heating elements the aforesaid wax saturated sheet of pliable paper or the like. Furthermore, the said wax sheet will function as a guard to avoid contact of glue with the cleats or heating elements as the glue in its liquid condition may exhume through the feathered edge adjacent the heating elements or pass outward through the joint to merely contact with the under side of the said wax sheet, said sheet being waxed as a means to avoid firm adhesion of the strip to the plywood skin, and to permit its easy removal therefrom.

It will now be understood by the herein disclosed method that when the plywood skin is sufficiently heated, rapid chemical reaction of the glue is accomplished and therefore the glue will solidify in a short length of time compared with the setting of glue under normal atmosphere temperature of a work room.

At the termination of the setting period of such glue, the cleats, together with the heating elements and the wax paper, are removed for further treatment on the plywood skin portions with respect to smoothing the joints for the usual overcoating as a finish for the exterior of the aircraft.

Modifications may be employed as lie within the scope of the appended claims.

Having fully described this invention what is claimed as new and desired to secure by Letters Patent is:

1. In a means for fastening feathered edged glued joints together and to accelerate the setting of the glue, a heating element to extend across the glued joints, electric power means to energize the heating element, a wood cleat as a retainer for the heating element and adapted to cover the same and nails driven through the cleat, heating element, glued joints and support for the joints to press the glued joints and heating element to snug engagement.

2. In a means for fastening feather edged glued joints together and to accelerate the setting of the glue, a plurality of thin strips of metal, as heating elements, of sufficient number to extend across the glued joints and being in juxta-position, electric power means to energize the said heating elements, a wood cleat as a retainer for each strip of heating elements and adapted to cover the same, the cleats registering in width with their respective heating elements and nails driven through the cleats, heating elements, the glued joints and into the support for the joints to bind the same to snug engagement.

THEODORE A. WELLS.
JOHN P. GATY.